(12) United States Patent
Sato

(10) Patent No.: US 11,003,416 B1
(45) Date of Patent: May 11, 2021

(54) AUDIO APPARATUS

(71) Applicant: TEAC CORPORATION, Tokyo (JP)

(72) Inventor: Dai Sato, Tokyo (JP)

(73) Assignee: TEAC CORPORATION, Tokyo (JP)

( * ) Notice: Subject to any disclaimer, the term of this patent is extended or adjusted under 35 U.S.C. 154(b) by 0 days.

(21) Appl. No.: 16/799,367

(22) Filed: Feb. 24, 2020

(30) Foreign Application Priority Data

Oct. 25, 2019 (JP) .............................. JP2019-194343

(51) Int. Cl.
  *G06F 3/16* (2006.01)
  *G06F 3/0484* (2013.01)

(52) U.S. Cl.
  CPC .......... *G06F 3/165* (2013.01); *G06F 3/04847* (2013.01)

(58) Field of Classification Search
  CPC .............................. G06F 3/165; G06F 3/04847
  See application file for complete search history.

(56) References Cited

FOREIGN PATENT DOCUMENTS

| JP | 2003-099038 A | * | 9/2001 | ............. | G06F 3/165 |
| JP | 3951655 B2 | | 8/2007 | | |

\* cited by examiner

*Primary Examiner* — Andrey Belousov
(74) *Attorney, Agent, or Firm* — Seed IP Law Group LLP

(57) ABSTRACT

An audio apparatus is disclosed which allows a user to easily visually confirm deviation of an operation position from a prescribed value even when the deviation is small. The audio apparatus includes an operator that operates an audio signal, a display that displays a relationship between a parameter setting value according to an operation of the operator and a prescribed value, and one or more processors that change a display form of the display. The one or more processors cause, when the parameter setting value is deviated from the prescribed value, display with a display form different from that when the parameter setting value coincides with the prescribed value, regardless of an amount of the deviation.

18 Claims, 11 Drawing Sheets

AUDIO APPARATUS

CROSS REFERENCE TO RELATED APPLICATION

This application claims priority to Japanese Patent Application No. 2019-194343 filed on Oct. 25, 2019, which is incorporated herein by reference in its entirety including the specification, claims, drawings, and abstract.

TECHNICAL FIELD

The present disclosure relates to an audio apparatus.

BACKGROUND

In the related art, structures are proposed in which, in an audio apparatus such as a mixing console, when a parameter setting value such as sound image localization (pan), a sound volume, or the like is displayed, an instruction line is displayed on a bar-shaped element or on a circular knob.

FIGS. 30 and 31 show example displays of a parameter setting value in the related art. FIG. 30 shows an example display 100 in which a line showing a prescribed value is displayed in a display region having a quadrangular shape (elongated shape), and a bar showing a current parameter setting value is displayed in an overlapping manner. FIG. 31 shows an example display 200 in which a line showing a prescribed value is displayed near a circular knob and a line showing the current parameter setting value is displayed.

Parameters to be set include parameters having prescribed values such as center of the sound image localization (pan) or 0 dB of the sound volume, and it is desired that the user can easily visually confirm whether the current parameter setting value coincides with the prescribed value or is deviated therefrom.

JP 3951655 B discloses, in order to provide a display device of an operator with improved viewability of an operation position of the operator, a display device of the operator having index display control means which causes an index to be displayed with a predetermined display form when the operation position of the operator is a predetermined reference position, and which gradually changes a display form of a display color, lightness, or a size of the index to a different display form from the predetermined display form according to an amount of deviation of the operation position from the reference position.

However, in the related art described above, because the display color, the lightness, or the size of the index is gradually changed according to the amount of deviation of the operation position from the reference position or the prescribed value (hereinafter, collectively referred to as "prescribed value"), when the deviation of the operation position from the prescribed value is small, the change of the display color or the like of the index is also consequently small, and there has been a problem in that it is difficult for the user to notice the change.

An advantage of the present disclosure lies in provision of a technique which allows the user to easily visually confirm that the operation position is deviated from the prescribed value even when the deviation of the operation position from the prescribed value is small.

SUMMARY

According to one aspect of the present disclosure, there is provided an audio apparatus comprising: an operator that operates an audio signal; a display that displays a relationship between a parameter setting value according to an operation of the operator and a prescribed value; and a controller that changes a display form of the display, such that, when the parameter setting value is deviated from the prescribed value, a display form is employed for the display which differs from a display form when the parameter setting value coincides with the prescribed value, regardless of an amount of the deviation.

According to another aspect of the present disclosure, the display has a display region, and the controller does not cause the display region to be displayed in a highlighted manner when the parameter setting value coincides with the prescribed value; and causes the display region to be uniformly displayed in the highlighted manner, regardless of the amount of deviation, when the parameter setting value is deviated from the prescribed value.

According to another aspect of the present disclosure, the operator is an operator for sound image localization, the display has display regions placed at left and right centered at a center which is the prescribed value, and the controller does not cause the display regions at the left and the right to be displayed in a highlighted manner when the parameter setting value coincides with the prescribed value; causes the display region at the left to be uniformly displayed in the highlighted manner, regardless of the amount of deviation, when the parameter setting value is deviated from the prescribed value to the left; and causes the display region at the right to be uniformly displayed in the highlighted manner, regardless of the amount of deviation, when the parameter setting value is deviated from the prescribed value to the right.

According to another aspect of the present disclosure, the display region at the left has a triangular shape with a width widening toward the left, and the display region at the right has a triangular shape with a width widening toward the right.

According to another aspect of the present disclosure, the operator is an operator for sound volume, the display has a first display region placed with reference to $-\infty$ which is the prescribed value, and a second display region placed with reference to 0 dB which is the prescribed value, and the controller does not cause the first display region and the second display region to be displayed in a highlighted manner when the parameter setting value coincides with the prescribed value; causes the first display region to be uniformly displayed in the highlighted manner, regardless of the amount of deviation, when the parameter setting value is deviated from the $-\infty$ and is operated to a value between $-\infty$ and 0 dB; and causes the second display region to be uniformly displayed in the highlighted manner, regardless of the amount of deviation, when the parameter setting value is deviated from the 0 dB and is operated beyond 0 dB.

According to another aspect of the present disclosure, the operator is an operator for sound volume, the display has a first display region placed with reference to $-\infty$ which is the prescribed value, and a second display region placed with reference to 0 dB which is the prescribed value, and the controller does not cause the first display region and the second display region to be displayed in a highlighted manner when the parameter setting value coincides with $-\infty$; causes the first display region to be uniformly displayed in the highlighted manner with a particular color, regardless of the amount of deviation, when the parameter setting value is deviated from the $-\infty$ and is operated to a value between $-\infty$ and 0 dB; causes the second display region to be uniformly displayed in the highlighted manner with a color different from the particular color, when the parameter setting value coincides with the 0 dB; and causes the second display region to be uniformly displayed in the highlighted manner with the particular color, regardless of the amount of deviation, when the parameter setting value is deviated from the 0 dB and is operated beyond 0 dB.

According to another aspect of the present disclosure, the controller further causes the parameter setting value to be displayed in an overlapping manner on the display region at a position corresponding to the amount of deviation from the prescribed value.

According to the present disclosure, even when the deviation of the parameter setting value from the prescribed value, according to an operation of the operator, is small, the user can easily visually confirm that the parameter setting value is deviated from the prescribed value. As a consequence, the user can easily operate the operator and set the parameter setting value to a desired value.

BRIEF DESCRIPTION OF DRAWINGS

Embodiment(s) of the present disclosure will be described based on the following figures, wherein.

DESCRIPTION OF EMBODIMENTS

An embodiment of the present disclosure will now be described with reference to the drawings.

Figure 1:
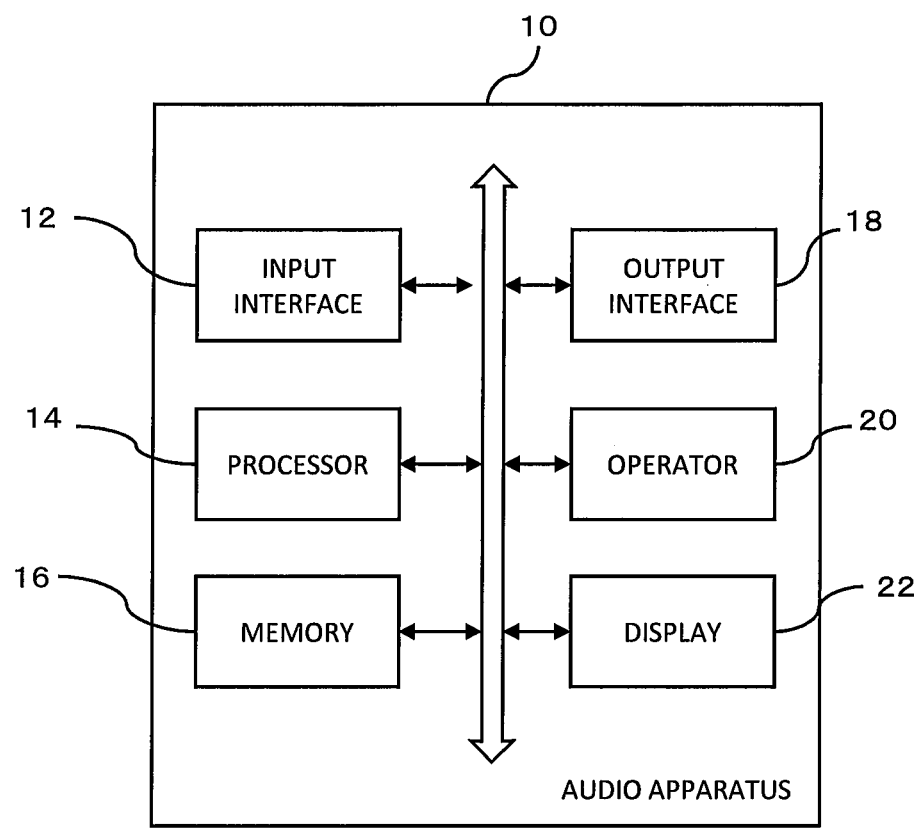
FIG. 1 is a structural block diagram of an embodiment of the present disclosure.

FIG. 1 is a structural block diagram of an audio apparatus 10 according to the present embodiment. The audio apparatus 10 is, for example, a digital mixing console which applies a mixing process of audio signals, but is not limited to the digital mixing console, and may be any arbitrary apparatus so long as the apparatus sets various parameters of the audio signal. In the digital mixing console, processes including routing, assignment, echo rising, mixing, and effect are applied on various input audio signals, and the processed signal is output.

The audio apparatus 10 includes an input interface 12, one or more processors 14, a memory 16, an output interface 18, an operator 20, and a display 22.

The input interface 12 has an analog signal input terminal, a digital signal input terminal, and an ADC (analog-todigital converter). An analog audio signal is converted into a digital audio signal by the ADC and the converted signal is then input.

The one or more processors 14 are formed from a CPU or the like, and execute various processes by reading and executing processing program(s) stored in the memory 16. Various processes of the one or more processors 14 include: detection of an operation position of the operator 20; comparison of a parameter setting value which is set according to the operation of the operator 20 and a prescribed value; and control of a display form of the display 22 according to the comparison between the parameter setting value and the prescribed value. In particular, the control of the display form of the display 22 according to the comparison between the parameter setting value and the prescribed value includes control to set different display forms between the case in which the parameter setting value coincides with the prescribed value and the case in which the parameter setting value is deviated from the prescribed value. The prescribed value may be stored in the memory 16 in advance, or may be stored in the memory 16 by the user inputting the value by operating the operator 20, various buttons, and the like.

The operator 20 is a switch, a button, or the like operated by the user, and includes switches and buttons for setting parameters such as the sound image localization (pan) and the sound volume. The one or more processors 14 detect an amount of operation of the operator 20, and adjust the sound image localization or the sound volume according to the detected amount of operation.

The display 22 displays various states of the audio apparatus 10. In particular, in the present embodiment, the display 22 displays parameter setting states of the sound image localization (pan) and the sound volume. The one or more processors 14 detect the amount of operation of the operator 20, and display the parameter setting states of the sound image localization (pan) and the sound volume on the display 22 based on the detected amount of operation. The display 22 is formed from a liquid crystal panel or an organic EL panel. Alternatively, the display 22 may be formed by arranging and placing point light sources such as LEDs in a continuous manner.

The output interface 18 includes an analog output terminal, a digital output terminal, and a DAC (digital-to-analog converter). A processed digital audio signal is converted into an analog audio signal by the DAC, and the converted signal is then output.

Figure 2:
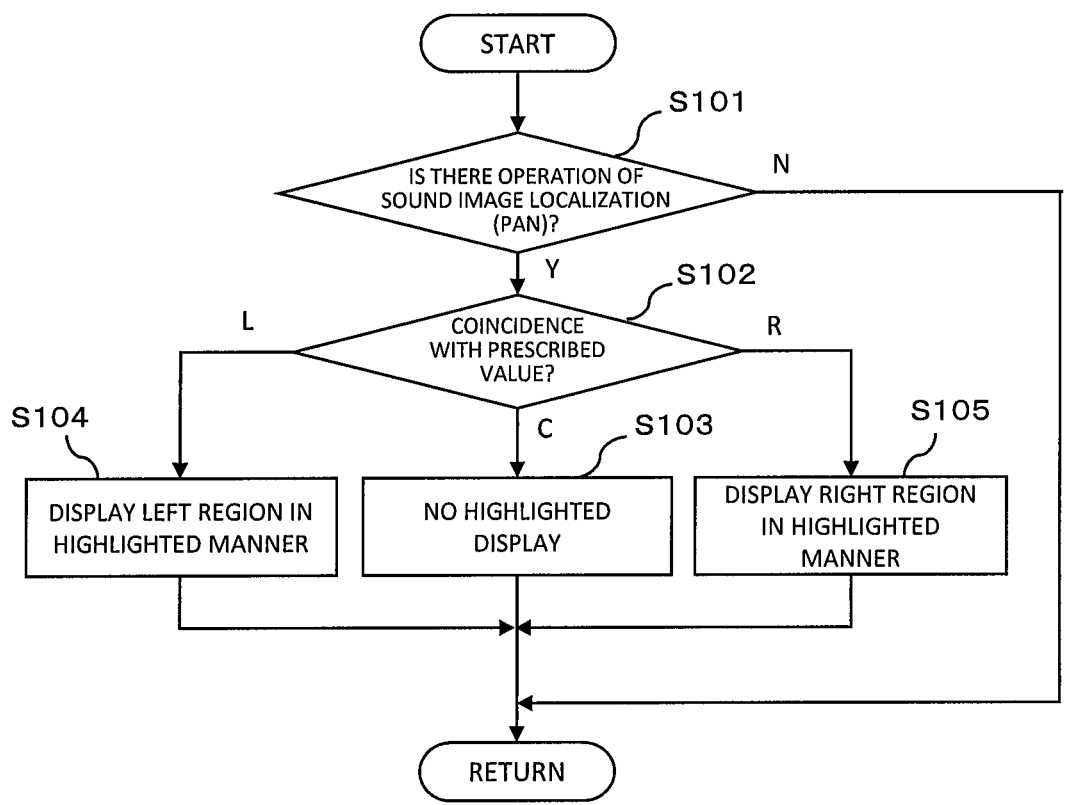
FIG. 2 is a process flowchart of an embodiment of the present disclosure.

FIG. 2 is a process flowchart of the present embodiment. The process is a process to operate the operator and set a parameter of the sound image localization (pan).

First, the one or more processors 14 determine whether or not an operator of the sound image localization (pan) is operated (S101).

When the one or more processors 14 detect that the operator of the sound image localization (pan) has been operated (YES in S101), the one or more processors 14 then determine whether or not an operation value of the sound image localization (PAN) coincides with a prescribed value (S102). Here, the prescribed value is determined in advance, and, in the case of the sound image localization (pan), the prescribed value is, for example, center.

When the parameter operation value of the sound image localization (pan) is the center (Center; abbreviated with "C") (determine as C in S102), the one or more processors 14 do not display an index of the sound image localization (pan) in a highlighted manner when the index of the sound image localization (pan) is displayed on the display 22 (S103).

When the parameter operation value of the sound image localization (pan) is deviated to the left (Left; abbreviated with "L") (determine as L in S102), the one or more processors 14 display a left region in a highlighted manner when the index of the sound image localization (pan) is displayed on the display 22, to emphasize left (L) (S104).

On the other hand, when the parameter operation value of the sound image localization (pan) is deviated to the right (Right; abbreviated with "R") (determine as R in S102), the one or more processors 14 display a right region in a highlighted manner when the index of the sound image localization (pan) is displayed on the display 22, to emphasize right (R) (S105).

More specifically, the one or more processors 14 employ, as display regions for displaying the index of the sound image localization (pan) on the display 22, two right triangles placed to oppose each other at a vertex of an acute angle, so that the right triangle at the left corresponds to the left (L) of the sound image localization (pan), the right triangle at the right corresponds to the right (R) of the sound image localization (pan), and the vertex where the two right triangles contact each other corresponds to the prescribed value (C) of the sound image localization (pan). In S104, the right triangle region at the left which is the left region is displayed in the highlighted manner, and the right triangle region at the right which is the right region is not displayed in the highlighted manner. In S105, the right triangle region at the right which is the right region is displayed in the highlighted manner, and the right triangle region at the left which is the left region is not displayed in the highlighted manner. In S103, the right triangle regions on the right and left are not displayed in the highlighted manner.

In the contrary, when the operation of the operator of the sound image localization (pan) is not detected (NO in S101), the processes of S102~S105 are not executed, and the current state is maintained. The processes of S101~S105 are repeatedly executed at a predetermined control period.

The display form of the sound image localization (pan) in the present embodiment will now be described more specifically.

Figure 3:
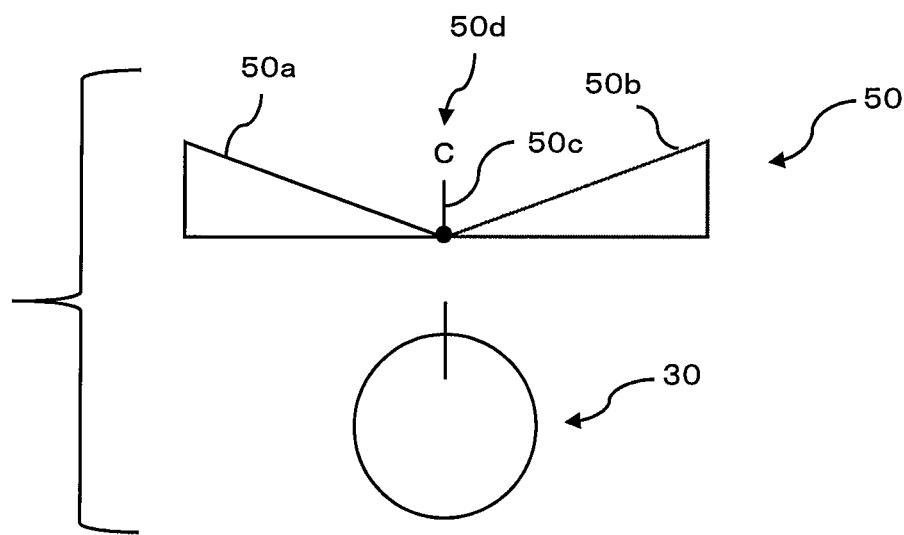
FIG. 3 is an explanatory diagram (part 1) of a change of a display form in an embodiment of the present disclosure.

FIG. 3 shows an example of an index display region 50 of the sound image localization (pan) displayed on the display 22. FIG. 3 shows a p process corresponding to S103 of FIG. 2.

The index display region 50 includes two right triangle regions 50a and 50b placed to oppose each other at a vertex of an acute angle. When two axes which are orthogonal to each other are an x axis (lateral direction) and a y axis (vertical direction), the right triangle regions 50a and 50b have shapes symmetric with respect to the y axis passing through the vertex of the acute angle, and two sides having the right angle therebetween are parallel respectively to the x axis and the y axis. The right triangle region 50a at the left has a width which is widened toward the left side, and the right triangle region 50b at the right has a width which is widened toward the right side. At the vertex of the acute angle where the two right triangle regions 50a and 50b contact each other, a line 50c showing the prescribed value (C) is displayed in parallel to the y axis direction.

FIG. 3 shows an operator 30 for the sound image localization (pan) at a lower part of the index display region 50. The operator 30 has a shape of a circular knob, and has a line which shows a current parameter setting value. In addition, a line showing the center (C) which is the prescribed value is displayed near the circular knob. The index display region 50 may be displayed near the operator 30 (for example, at an upper part of the operator 30 as shown in FIG. 3), or may be displayed at a position unrelated to the position of the operator 30. In FIG. 3, for the purpose of explanation, the operator 30 and the index display region 50 are collectively shown.

When the parameter setting value of the operator 30 coincides with the prescribed value (C), the right triangle region 50*a* at the left and the right triangle region 50*b* at the right are not displayed in a highlighted manner. At an upper part of the line 50*c* showing the prescribed value, the current parameter setting value is displayed with a text and a number. In FIG. 3, because the current parameter setting value coincides with the prescribed value, the one or more processors 14 display a text 50*d* of "C", showing that the parameter setting value is the prescribed value. Along with this display, the line 50*c* may be displayed in a highlighted manner by displaying, for example, a circle mark or the like on the line 50*c*.

Figure 4:
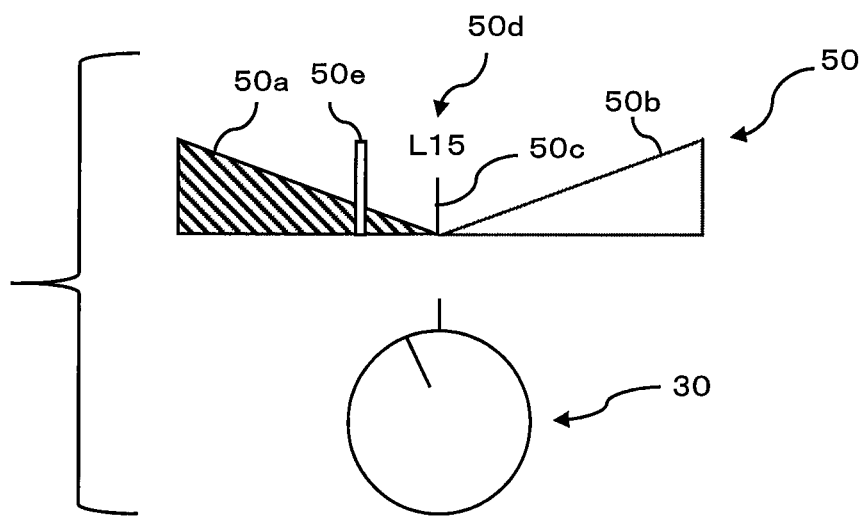
FIG. 4 is an explanatory diagram (part 2) of the change of the display form in the embodiment of the present disclosure.

FIG. 4 shows a process corresponding to S104 of FIG. 2.

The parameter setting value of the operator 30 is positioned at the left side relative to the prescribed value.

In this case, the right triangle region 50*a* at the left, of the index display region 50, is displayed in a highlighted manner. FIG. 4 shows the highlighted display with hatching of the right triangle region 50*a* at the left. The right triangle region 50*b* at the right is not displayed in the highlighted manner. In addition, because the current parameter setting value does not coincide with the prescribed value and is deviated from the prescribed value to the left, the one or more processors 14 display a text and a number 50*d* of "L15", as an amount of deviation from the prescribed value. The number shows the amount of deviation from the prescribed value. Further, the one or more processors 14 display a bar 50*e* showing the current parameter setting value in an overlapping manner on the right triangle region 50*a* at the left which is displayed in the highlighted manner.

In FIG. 4, the current parameter setting value can be visually confirmed by the text and number 50*d* and the bar 50*e*. In addition, as the right triangle region 50*a* at the left is displayed in the highlighted manner, it can be easily visually confirmed that the parameter setting value is deviated from the prescribed value to the left. It should be noted that the entire region of the right triangle region 50*a* at the left is displayed in the highlighted manner regardless of the size of the amount of deviation of the current parameter setting value from the prescribed value.

Figure 5:
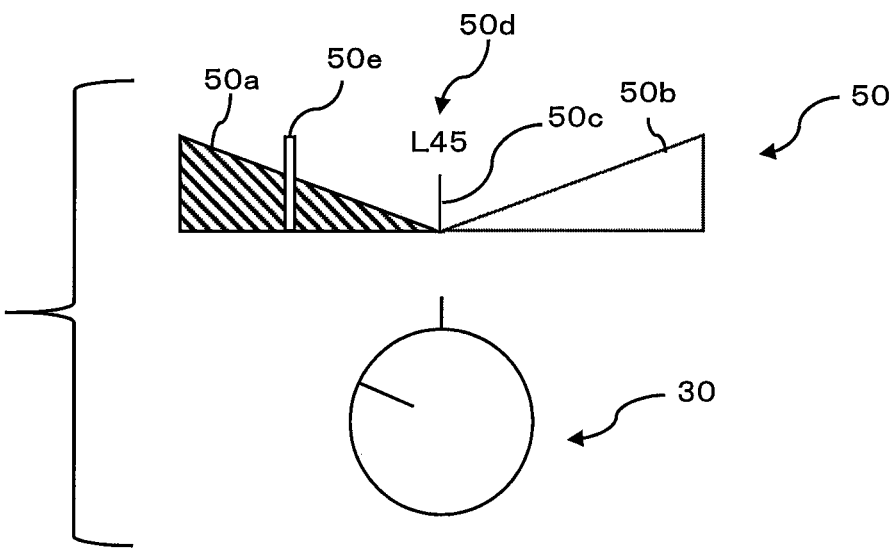
FIG. 5 is an explanatory diagram (part 3) of the change of the display form in the embodiment of the present disclosure.

FIG. 5 shows another process corresponding to S104 of FIG. 2.

The parameter setting value of the operator 30 is positioned at the left relative to the prescribed value, and at a further left position than that in the case of FIG. 4.

In this case, the right triangle region 50*a* at the left, of the index display region 50, is displayed in the highlighted manner. In FIG. 5, the highlighted display is shown with the hatching of the right triangle region 50*a* at the left. The right triangle region 50*b* at the right is not displayed in the highlighted manner. In addition, because the current parameter setting value does not coincide with the prescribed value and is at the left of the prescribed value, the one or more processors 14 display a text and a number 50*d* of "L45", as the amount of deviation from the prescribed value. The number shows the amount of deviation from the prescribed value. Further, the one or more processors 14 display the bar 50*e* showing the current parameter setting value in an overlapping manner on the right triangle region 50*a* at the left which is displayed in the highlighted manner. The bar 50*e* is displayed at a further left side than that in the case of FIG. 4. This is in correspondence to the amount of deviation shown by "L45".

In FIG. 5, the current parameter setting value can be visually confirmed by the text and number 50*d* and the bar 50*e*. In addition, because the right triangle region 50*a* at the left is displayed in the highlighted manner, it can be easily visually confirmed that the current parameter setting value is deviated from the prescribed value to the left. It should be noted that, in this case also, similar to FIG. 4, the entire region of the right triangle region 50*a* at the left is displayed in the highlighted manner regardless of the size of the amount of deviation of the current parameter setting value from the prescribed value.

Figure 6:
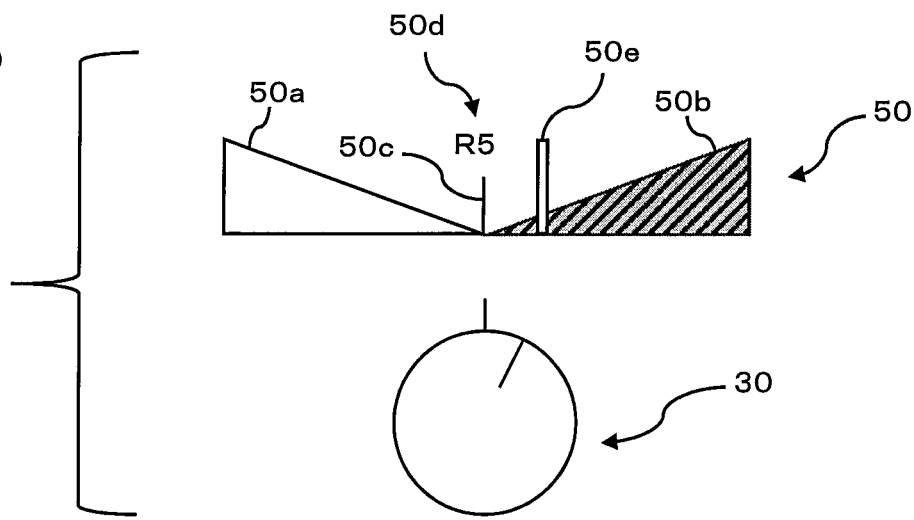
FIG. 6 is an explanatory diagram (part 4) of the change of the display form in the embodiment of the present disclosure.

FIG. 6 shows a process corresponding to S105 of FIG. 2.

The parameter setting value of the operator 30 is positioned at the right relative to the prescribed value.

In this case, the right triangle region 50*b* at the right, of the index display region 50, is displayed in the highlighted manner. In FIG. 6, the highlighted display is shown by the hatching of the right triangle region 50*b* at the right. The right triangle region 50*a* at the left is not displayed in the highlighted manner. Moreover, because the current parameter setting value does not coincide with the prescribed value and is at the right of the prescribed value, the one or more processors 14 display a text and a number 50*d* of "R5", as the amount of deviation from the prescribed value. The number shows the amount of deviation from the prescribed value. Further, the one or more processors 14 display the bar 50*e* showing the current parameter setting value in an overlapping manner on the triangle region 50*b* at the right which is displayed in the highlighted manner.

In FIG. 6, the current parameter setting value can be visually confirmed by the text and the number 50*d* and the bar 50*e*. In addition, because the right triangle region 50*b* at the right is displayed in the highlighted manner, it can be easily visually confirmed that the current parameter setting value is deviated from the prescribed value to the right. Here, the entire region of the right triangle region 50*b* at the right is displayed in the highlighted manner regardless of the size of the amount of deviation of the current parameter setting value from the prescribed value.

Figure 7:
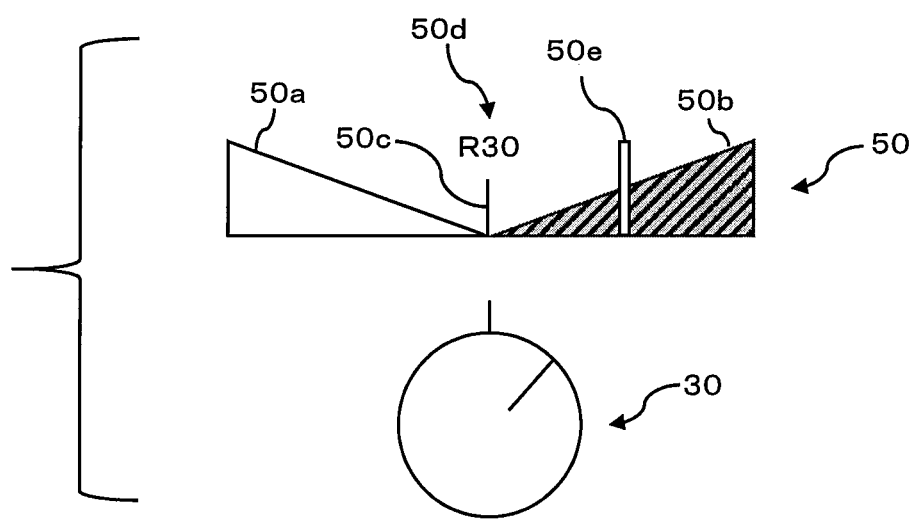
FIG. 7 is an explanatory diagram (part 5) of the change of the display form in the embodiment of the present disclosure.

FIG. 7 shows another process corresponding to S105 of FIG. 2.

The parameter setting value of the operator 30 is positioned at the right relative to the prescribed value, and is at a further right side than that in the case of FIG. 6.

In this case, the right triangle region 50*b* at the right, of the index display region 50, is displayed in the highlighted manner. In FIG. 7, the highlighted display is shown by the hatching of the right triangle region 50*b* at the right. The right triangle region 50*a* at the left is not displayed in the highlighted manner. In addition, because the current parameter setting value does not coincide with the prescribed value and is at the right of the prescribed value, the one or more processors 14 display a text and number 50*d* of "R30", as the amount of deviation from the prescribed value. The number shows the amount of deviation from the prescribed value. Further, the one or more processors 14 display the bar 50*e* showing the current parameter setting value in an overlapping manner on the right triangle region 50*b* at the right which is displayed in the highlighted manner. The bar 50*e* is displayed at a further right side than that in the case of FIG. 6, in correspondence to the amount of deviation shown by "R30".

In FIG. 7, the current parameter setting value can be visually confirmed by the text and number 50*d* and the bar 50*e*. In addition, because the right triangle region 50*b* at the right is displayed in the highlighted manner, it can be easily visually confirmed that the current parameter setting value is deviated from the prescribed value to the right. In this case also, similar to FIG. 6, the entire region of the right triangle region 50*b* at the right is displayed in the highlighted manner regardless of the size of the amount of deviation of the current parameter value from the prescribed value.

As shown in FIGS. 4~7, in the present embodiment, when the parameter setting value of the sound image localization (pan) is deviated from the prescribed value (center: C) to the left or to the right, the entire region of the right triangle region corresponding to the deviation, of the right triangle regions 50*a* and 50*b*, is uniformly displayed in the highlighted manner regardless of the amount of deviation. Thus, even when the amount of deviation is slight, the user can very easily visually confirm the deviation of and the direction of the deviation of the parameter setting value of the sound image localization (pan) from the prescribed value, by visually confirming the region which is displayed in the highlighted manner. That is, in the configuration of the related art in which the display color or the like is gradually changed according to the amount of deviation, because the amount of change is small when the amount of deviation is small, the deviation from the prescribed value in this case cannot be understood. In the contrary, in the present embodiment, even when the amount of deviation is small, the entire region is displayed in the highlighted manner, and thus, the deviation from the prescribed value can be easily visually confirmed.

Further, when the current parameter value is deviated from the center which is the prescribed value to the left, the right triangle region 50*a* at the left is displayed in the highlighted manner, and, when the current parameter value is deviated from the center which is the prescribed value to the right, the right triangle region 50*b* at the right is displayed in the highlighted manner. Thus, the user can visually confirm with one look, in addition to whether or not the current parameter value is deviated from the prescribed value, to which direction of left or right the current parameter value is deviated. The present embodiment may alternatively be considered as enlarging the deviation from the prescribed value and showing the deviation with the highlighted display.

The "highlighted display" in the present embodiment includes display with a particular color, display with a particular design or pattern, display with a particular lightness, a blinking display with a particular period, or the like. When displaying with the particular color, for example, the display may be in blue color when the background color is black, or the like, but the display with the particular color is not limited to this configuration. In addition, the display forms of the highlighted display of the right triangle regions 50*a* and 50*b* may be the same or may differ from each other. For example, the highlighted display of the right triangle region 50*a* may be in blue and the highlighted display of the right triangle region 50*b* may be in red.

In addition, in the present embodiment, the one or more processors 14 change the display form of the index display region 50 between the case in which the parameter setting value coincides with the prescribed value and the case in which the parameter setting value is deviated from the prescribed value. The coincidence of the parameter setting value with the prescribed value includes a case in which the parameter setting value precisely coincides with the prescribed value, and a case in which the parameter setting value does not precisely coincide with the prescribed value, but is within a certain allowable range. That is, when the certain allowable range is δ (>0), the parameter setting value and the prescribed value may be determined as coincident when:

|parameter setting value−prescribed value|<δ.

Further, in FIGS. 3~7, the index display region 50 is formed from the right triangle regions 50*a* and 50*b* at the left and the right, but the shape thereof is arbitrary. Thus, the index display region 50 may alternatively have equilateral triangle shapes placed at the left and the right, elliptical shapes placed at the left and the right, quadrangular shapes placed at the left and the right, or the like.

Figure 8:
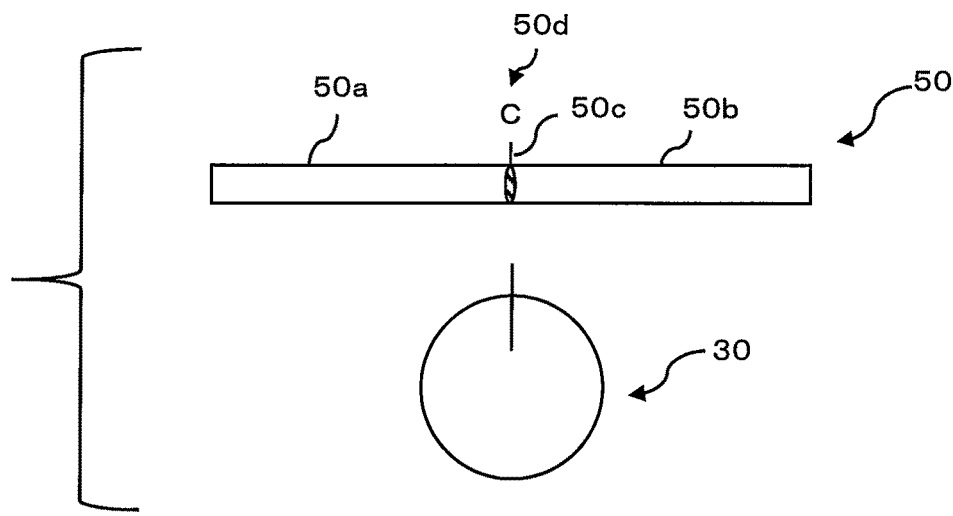
FIG. 8 is an explanatory diagram (part 1) of a change of a display form in another configuration of the embodiment of the present disclosure.
Figure 9:
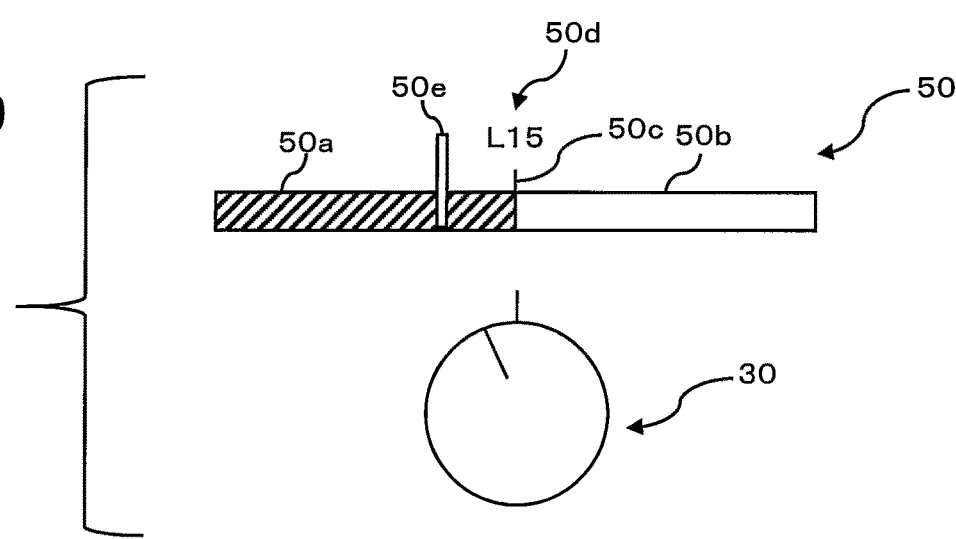
FIG. 9 is an explanatory diagram (part 2) of the change of the display form in the other configuration of the embodiment of the present disclosure.
Figure 10:
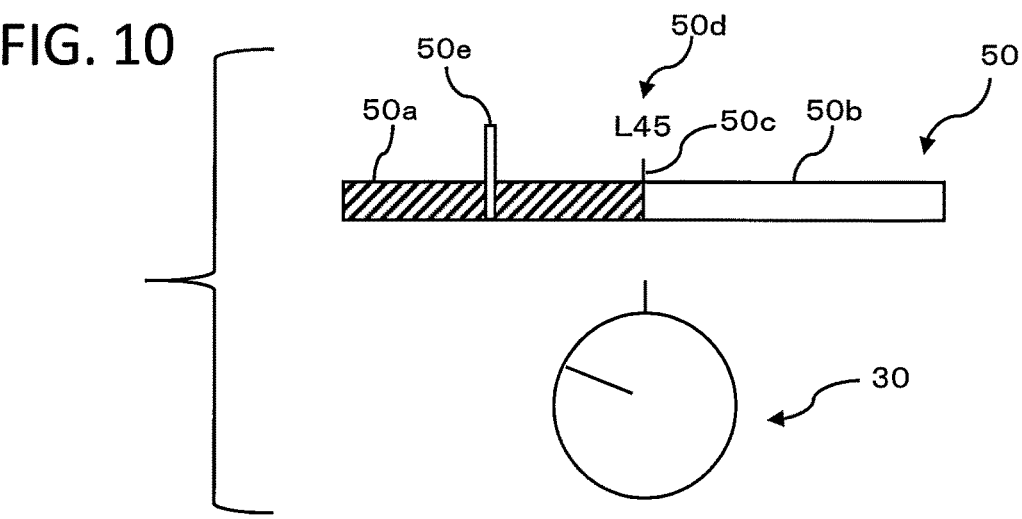
FIG. 10 is an explanatory diagram (part 3) of the change of the display form in the other configuration of the embodiment of the present disclosure.

FIGS. 8~10 show an example in which the index display region 50 is formed from quadrangular shapes (bar shapes) 50*a* and 50*b* at the left and the right.

FIG. 8 shows a process corresponding to S103 of FIG. 2.

The index display region 50 includes two quadrangular regions 50*a* and 50*b* placed opposing each other. When two axes orthogonal to each other are an x axis (lateral direction) and a y axis (vertical direction), the quadrangular regions 50*a* and 50*b* have shapes symmetric about the y axis passing through the sides which contact each other, and the long side and the short side are respectively parallel to the x axis and the y axis. On the sides where the two quadrangular regions 50*a* and 50*b* contact each other, a line 50*c* showing the prescribed value (C) is displayed in parallel to the y axis direction.

When the parameter setting value of the operator 30 coincides with the prescribed value (C), the left quadrangular region 50*a* and the right quadrangular region 50*b* are not displayed in the highlighted manner. In addition, at an upper part of the line 50*c* showing the prescribed value, the current parameter setting value is displayed with a text and a number. In FIG. 8, because the current parameter setting value coincides with the prescribed value, the one or more processors 14 display a text 50*d* of "C", showing that the current parameter setting value is the prescribed value. Along with this display, the line 50*c* may be displayed in the highlighted manner by displaying, for example, an ellipse mark or the like on the line 50*c*.

FIG. 9 shows a process corresponding to S104 of FIG. 2.

The parameter setting value of the operator 30 is positioned at the left relative to the prescribed value.

In this case, the left quadrangular region 50*a* of the index display region 50 is displayed in the highlighted manner. In FIG. 9, the highlighted display is shown by the hatching of the left rectangular region 50*a*. The right quadrangular region 50*b* is not displayed in the highlighted manner. In addition, because the current parameter setting value does not coincide with the prescribed value and is at the left of the prescribed value, the one or more processors 14 display a text and number 50*d* of "L15", as the amount of deviation from the prescribed value. The number shows the amount of deviation from the prescribed value. Further, the one or more processors 14 display a bar 50*e* showing the current parameter setting value in an overlapping manner on the left quadrangular region 50*a* displayed in the highlighted manner.

In FIG. 9, the current parameter setting value can be visually confirmed by the text and number 50*d* and the bar 50*e*. In addition, because the left rectangular region 50*a* is displayed in the highlighted manner, it can be easily visually confirmed that the current parameter setting value is deviated from the prescribed value to the left. The entire region of the left quadrangular region 50*a* is displayed in the highlighted manner regardless of the size of the amount of deviation of the current parameter setting value from the prescribed value. FIG. 10 shows another process corresponding to S104 of FIG. 2.

The parameter setting value of the operator 30 is positioned at the left relative to the prescribed value, and at a further left side than that in the case of FIG. 9.

In this case, the left quadrangular region 50a of the index display region 50 is displayed in the highlighted manner. In FIG. 10, the highlighted display is shown by the hatching of the left quadrangular region 50a. The right quadrangular region 50b is not displayed in the highlighted manner. In addition, because the current parameter setting value does not coincide with the prescribed value and is at the left of the prescribed value, the one or more processors 14 display a text and number of "L45", as the amount of deviation from the prescribed value. The number shows the amount of deviation from the prescribed value. Further, the one or more processors 14 display the bar 50e showing the current parameter setting value in an overlapping manner on the left quadrangular region 50a displayed in the highlighted manner. The bar 50e is displayed at a further left side than that in the case of FIG. 9, corresponding to the amount of deviation shown by "L45".

In FIG. 10, the current parameter setting value can be visually confirmed by the text and number 50d and the bar 50e. In addition, because the left quadrangular region 50a is displayed in the highlighted manner, it can be easily visually confirmed that the current parameter setting value is deviated from the prescribed value to the left. The entire region of the left quadrangular region 50a is displayed in the highlighted manner regardless of the size of the amount of deviation of the current parameter setting value from the prescribed value. Next, a parameter setting of a sound volume will be described.

Figure 11:
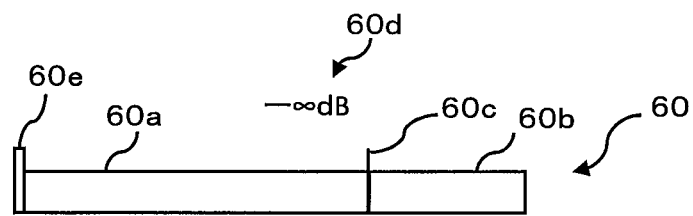
FIG. 11 is an explanatory diagram (part 1) of a change of a display form in a further configuration of the embodiment of the present disclosure.

FIG. 11 shows an example of an index display region 60 of sound volume displayed on the display 22. With regard to the parameter setting value of the sound volume, two values, $-\infty$ (no sound) and 0 dB (no adjustment of sound volume) are set as the prescribed values.

The index display region 60 includes two quadrangular regions 60a and 60b placed opposing each other. The quadrangular region 60a corresponds to a first display region, and the quadrangular region 60b corresponds to a second display region. When two axes which are orthogonal to each other are an x axis (lateral direction) and a y axis (vertical direction), long sides and short sides of the quadrangular regions 60a and 60b are respectively parallel to the x axis and the y axis. The left quadrangular region 60a corresponds to the sound volume of $-\infty$ to 0 dB, and the right quadrangular region 60b corresponds to the sound volume of 0 dB or greater. On the sides of the two quadrangular regions 60a and 60, which are placed in series, which contact each other, a line 60c showing 0 dB is displayed in parallel to the y axis direction.

When the parameter setting value of the operator of the sound volume coincides with $-\infty$ which is the prescribed value, the left quadrangular region 60a and the right quadrangular region 60b are not displayed in the highlighted manner. In addition, at an upper part of the line 60c showing the prescribed value, the current parameter setting value is displayed with a text and a number. In FIG. 11, because the current parameter setting value coincides with the prescribed value, the one or more processors 14 display a text 60d of "$-\infty$" showing the prescribed value. In addition, the one or more processors 14 display a bar 60e showing the current parameter setting value in an overlapping manner on the left quadrangular region 60a. That is, because the current parameter setting value is $-\infty$, the bar 60e is displayed in an overlapping manner at a left end of the left quadrangular region 60a.

Figure 12:
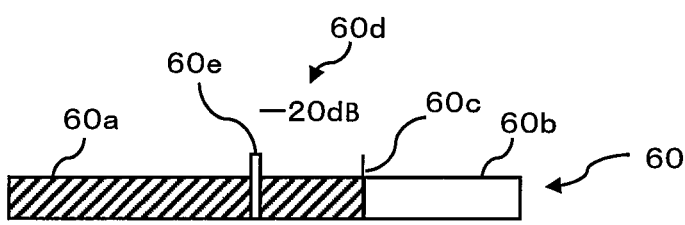
FIG. 12 is an explanatory diagram (part 2) of the change of the display form in the further configuration of the embodiment of the present disclosure.

FIG. 12 shows a case in which the user operates the sound volume from $-\infty$ to a value less than 0 dB.

In this case, the left quadrangular region 60a of the index display region 60 is displayed in the highlighted manner. In FIG. 12, the highlighted display is shown by the hatching of the left quadrangular region 60a. Because the parameter setting value of the sound volume is between $-\infty$ and 0 dB, the right quadrangular region 60b is not displayed in the highlighted manner. In addition, the one or more processors 14 display a text and number 60d of "$-20$ dB", as the current parameter setting value of the sound volume. Further, the one or more processors 14 display the bar 60e showing the current parameter setting value in an overlapping manner on the left quadrangular region 60a displayed in the highlighted manner.

In FIG. 12, the current parameter setting value can be visually confirmed by the text and number 60d and the bar 60e. In addition, because the left quadrangular region 60a is displayed in the highlighted manner, it can be easily visually confirmed that the current parameter setting value is deviated from $-\infty$ which is the prescribed value. An entire region of the left quadrangular region 60a is displayed in the highlighted manner regardless of the size of the amount of deviation of the current parameter setting value from the prescribed value. In addition, as the right quadrangular region 60b is not displayed in the highlighted manner, it is possible to simultaneously visually confirm that the current parameter setting value is less than 0 dB, which is the other prescribed value.

Figure 13:
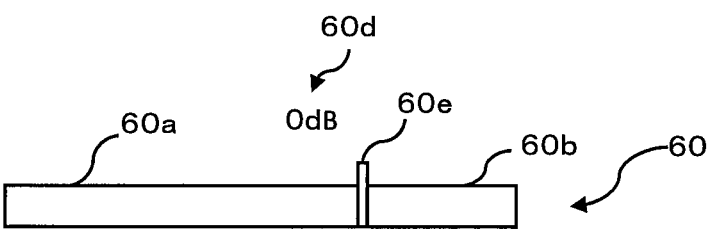
FIG. 13 is an explanatory diagram (part 3) of the change of the display form in the further configuration of the embodiment of the present disclosure.

FIG. 13 shows a case in which the user operates the volume to 0 dB.

In this case, the quadrangular regions 60a and 60b of the index display region 60 are not displayed in the highlighted manner. In addition, the one or more processors 14 display the text and number 60d of "0 dB", as the current parameter setting value of the sound volume. Further, the one or more processors 14 display the bar 60e showing the current parameter setting value in an overlapping manner on the contacting sides of the quadrangular regions 60a and 60b.

In FIG. 13, the current parameter setting value can be visually confirmed by the text and number 60d and the bar 60e. In addition, because the quadrangular regions 60a and 60b are not displayed in the highlighted manner, it can be easily visually confirmed that the current parameter setting value coincides with 0 dB which is the prescribed value.

Figure 14:
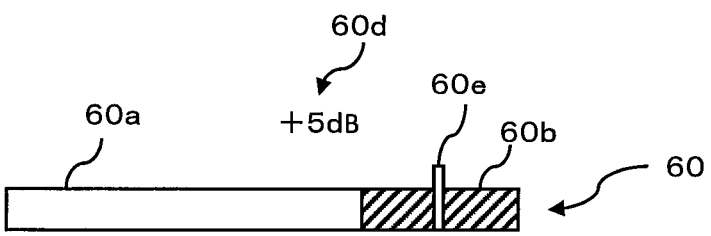
FIG. 14 is an explanatory diagram (part 4) of the change of the display form in the further configuration of the embodiment of the present disclosure.

FIG. 14 shows a case in which the user operates the sound volume beyond 0 dB.

In this case, the left quadrangular region 60a of the index display region 60 is not displayed in the highlighted manner, and the right quadrangular region 60b is displayed in the highlighted manner. In addition, the one or more processors 14 display a text and number of "+5 dB", as the current parameter setting value of the sound volume. Further, the one or more processors 14 display the bar 60e showing the current parameter setting value in an overlapping manner on the right quadrangular region 60b displayed in the highlighted manner.

In FIG. 14, the current parameter setting value can be visually confirmed by the text and number 60d and the bar 60e. In addition, because the right quadrangular region 60b is displayed in the highlighted manner, it can be easily visually confirmed that the current parameter setting value is deviated from 0 dB which is the prescribed value. An entire region of the right quadrangular region 60b is displayed in the highlighted manner regardless of the size of the amount of deviation of the current parameter setting value from the prescribed value.

The relationship between the highlighted displays of the quadrangular regions 60*a* and 60*b* and the parameter setting values in the present embodiment can be summarized as follows.

(1) Parameter setting value=−∞
Quadrangular region 60*a*: non-highlighted display
Quadrangular region 60*b*: non-highlighted display
(2) −∞<Parameter setting value <0 dB
Quadrangular region 60*a*: highlighted display
Quadrangular region 60*b*: non-highlighted display
(3) Parameter setting value=0 dB
Quadrangular region 60*a*: non-highlighted display
Quadrangular region 60*b*: non-highlighted display
(4) 0 dB<Parameter setting value
Quadrangular region 60*a*: non-highlighted display
Quadrangular region 60*b*: highlighted display In the cases of (1) and (3) described above, because the parameter setting value coincides with the prescribed value, the quadrangular regions 60*a* and 60*b* are not displayed in the highlighted manner (non-highlighted display), but the user can distinguish between these cases by the number 60*d* or the bar display 60*e* showing the current parameter setting value.

Figure 15:
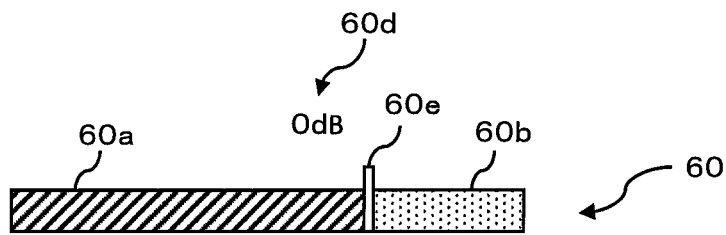
FIG. 15 is an explanatory diagram (part 5) of the change of the display form in the further configuration of the embodiment of the present disclosure.
Figure 16:
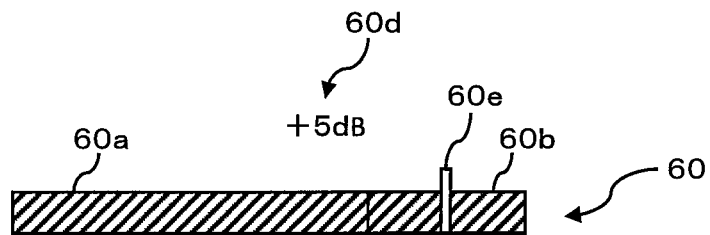
FIG. 16 is an explanatory diagram (part 6) of the change of the display form in the further configuration of the embodiment of the present disclosure.

FIGS. 15 and 16 show other example displays of the quadrangular regions 60*a* and 60*b*.

FIG. 15 shows a case in which the user operates the sound volume to 0 dB.

In this case, the left quadrangular region 60*a* of the index display region 60 is displayed in a highlighted manner with a particular color, and the right quadrangular region 60*b* is displayed in a highlighted manner with a different particular color. For example, the left quadrangular region 60*a* is displayed in the highlighted manner with the blue color, and the right quadrangular region 60*b* is displayed in the highlighted manner with the white color, or the like. In addition, the one or more processors 14 display a text and number of "0 dB", as the current parameter setting value of the sound volume. Further, the one or more processors 14 display the bar 60*e* showing the current parameter setting value in an overlapping manner. As for the quadrangular region 60*a*, the quadrangular region 60*a* is uniformly displayed in the highlighted manner regardless of the size of the amount of deviation from −∞ which is the prescribed value. As for the quadrangular region 60*b*, as the quadrangular region 60*b* is displayed in the highlighted manner with a different color, it can be visually confirmed that the current parameter setting value is at 0 dB, which is the prescribed value.

FIG. 16 shows a case in which the user operates the sound volume beyond 0 dB.

In this case, the left quadrangular region 60*a* of the index display region 60 is displayed in the highlighted manner with a particular color, and the right quadrangular region 60*b* is displayed in the highlighted display with the same particular color. For example, the left quadrangular region 60*a* is displayed in the highlighted manner with the blue color, and the right quadrangular region 60*b* is also displayed in the highlighted manner with the blue color. In addition, the one or more processors 14 display a text and number 60*d* of "+5 dB" as the current parameter setting value of the sound volume. Further, the one or more processors 14 display the bar 60*e* showing the current parameter setting value in an overlapping manner. As for the quadrangular region 60*b*, the quadrangular region 60*b* is uniformly displayed in the highlighted manner regardless of the size of the amount of deviation from 0 dB which is the prescribed value. Because the quadrangular regions 60*a* and 60*b* are both displayed in the highlighted manner with the same color, the user can easily visually confirm that the parameter setting value exceeds 0 dB.

FIGS. 17~29 show example displays when the display 22 is formed by placing point light sources such as LEDs in a continuous arrangement.

Figure 17:
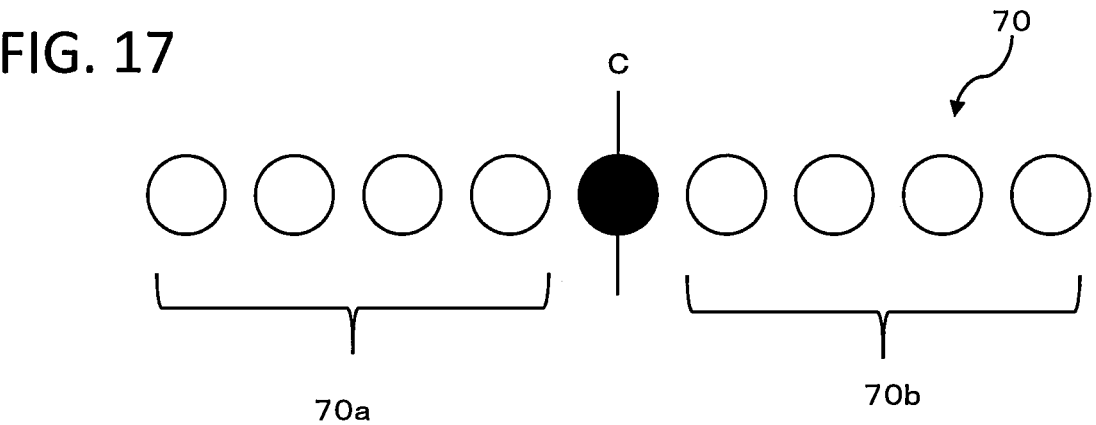
FIG. 17 is an explanatory diagram (part 7) of the change of the display form in the further configuration of the embodiment of the present disclosure.
Figure 18:
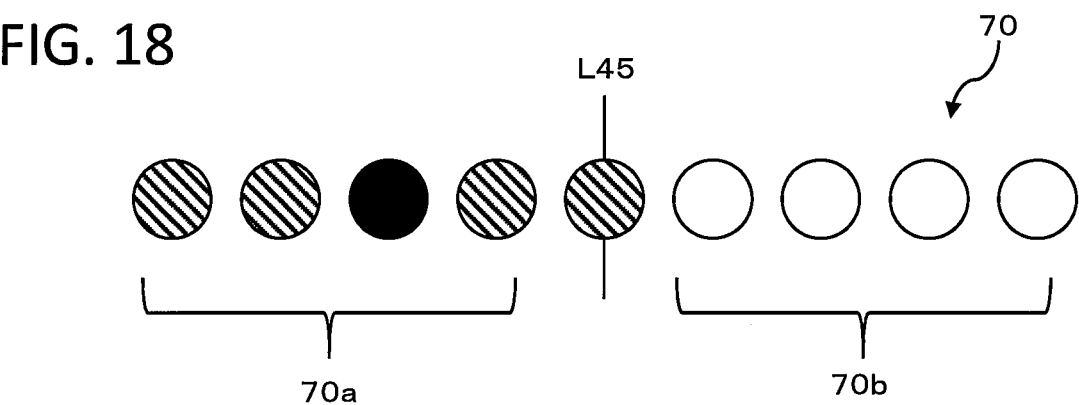
FIG. 18 is an explanatory diagram (part 8) of the change of the display form in the further configuration of the embodiment of the present disclosure.
Figure 19:
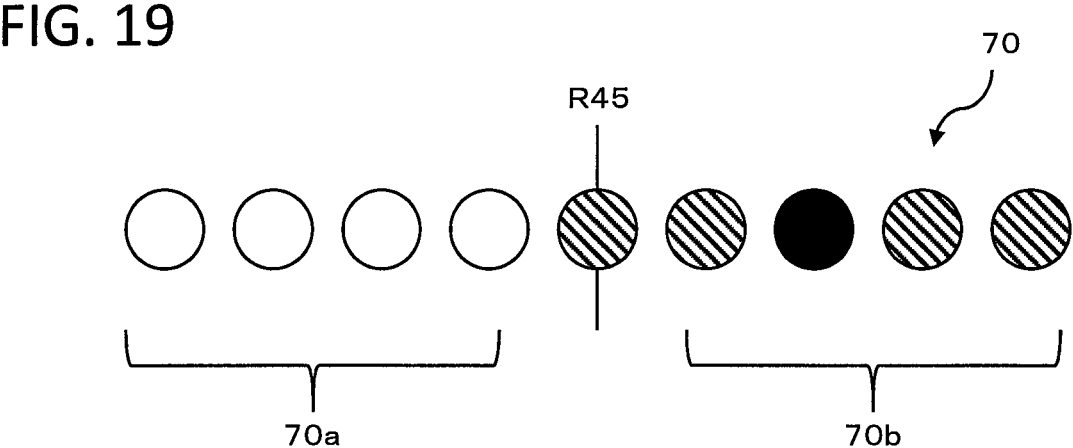
FIG. 19 is an explanatory diagram (part 9) of the change of the display form in the further configuration of the embodiment of the present disclosure.

FIGS. 17~19 show examples of an index display region 70 of the sound image localization (pan). The index display region 70 is formed by placing a plurality of LEDs on a straight line. More specifically, the index display region 70 is formed from a center LED, a group of LEDs 70*a* placed at the left of the center LED, and a group of LEDs 70*b* placed at the right of the center LED.

FIG. 17 shows a case in which the parameter setting value of the operator 30 coincides with the prescribed value (C). In this case, only the center LED is lighted with a first color, and the group of LEDs 70*a* at the left and the group of LEDs 70*b* at the right are not lighted and are not displayed in the highlighted manner.

FIG. 18 shows a case in which the parameter setting value of the operator 30 is positioned at the left relative to the prescribed value. In this case, the center LED and the group of LEDs 70*a* at the left are lighted with a second color and are displayed in the highlighted manner, and the group of LEDs 70*b* at the right are not lighted and are not displayed in the highlighted manner. Further, in the group of LEDs 70*a* at the left, an LED at a position corresponding to the parameter setting value is lighted with the first color.

FIG. 19 shows a case in which the parameter setting value of the operator 30 is positioned at the right relative to the prescribed value. In this case, the center LED and the group of LEDs 70*b* at the right are lighted with the second color and are displayed in the highlighted manner, and the group of LEDs 70*a* at the left are not lighted and are not displayed in the highlighted manner. In addition, in the group of LEDs 70*b* at the right, an LED at a position corresponding to the parameter setting value is lighted with the first color.

FIGS. 20~29 show examples of an index display region 80 of the sound volume.

Figure 20:
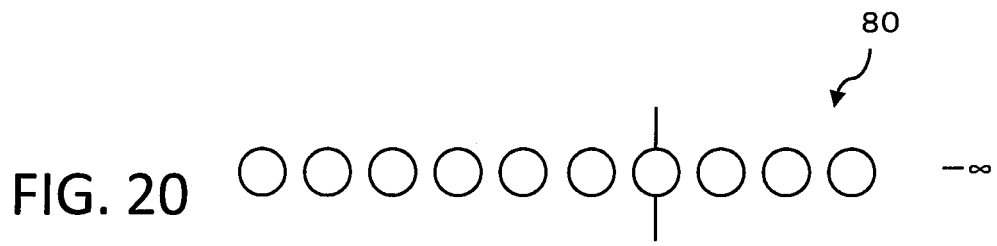
FIG. 20 is an explanatory diagram (part 10) of the change of the display form in the further configuration of the embodiment of the present disclosure.

FIG. 20 shows a case in which the parameter setting value of the operator of the sound volume coincides with −∞ which is the prescribed value. In this case, none of the LEDs is lighted and is displayed in the highlighted manner.

Figure 21:
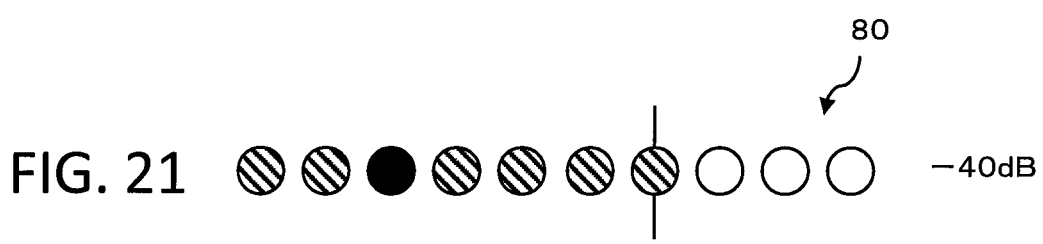
FIG. 21 is an explanatory diagram (part 11) of the change of the display form in the further configuration of the embodiment of the present disclosure.

FIG. 21 shows a case in which the user operates the sound volume to −40 dB. In this case, an LED corresponding to 0 dB which is the prescribed value and a group of LEDs at the left of this LED are lighted in a second color and are displayed in the highlighted manner, and an LED, in this group of LEDs, at a position corresponding to the operation value is lighted in a first color. A group of LEDs at the right of the LED corresponding to 0 dB are not lighted and are not displayed in the highlighted manner.

Figure 22:
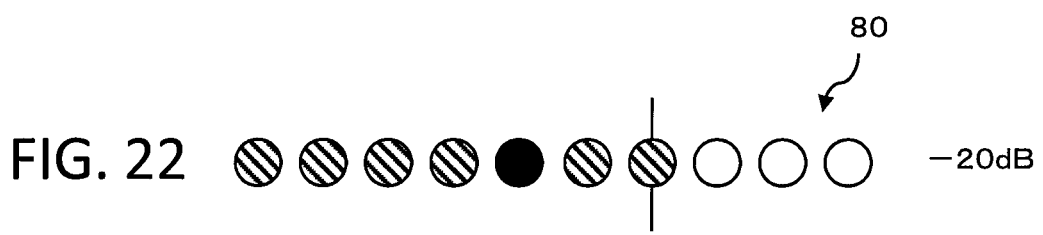
FIG. 22 is an explanatory diagram (part 12) of the change of the display form in the further configuration of the embodiment of the present disclosure.

FIG. 22 shows a case in which the user operates the sound volume to −20 dB. In this case, the LED corresponding to 0 dB which is the prescribed value and a group of LEDs at the left of this LED are lighted with the second color and are displayed in the highlighted manner, and an LED, in this group of LEDs, at a position corresponding to the operation value is lighted with the first color. A group of LEDs at the right of the LED corresponding to 0 dB are not lighted and are not displayed in the highlighted manner.

Figure 23:
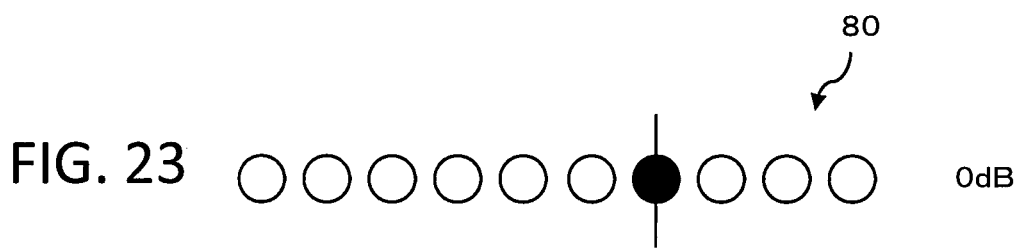
FIG. 23 is an explanatory diagram (part 13) of the change of the display form in the further configuration of the embodiment of the present disclosure.

FIG. 23 shows a case in which the user operates the sound volume to 0 dB which is the prescribed value. In this case, only the LED corresponding to 0 dB which is the prescribed value is lighted with the first color, and the group of LEDs at the left and the group of LEDs at the right are not lighted and are not displayed in the highlighted manner.

Figure 24:
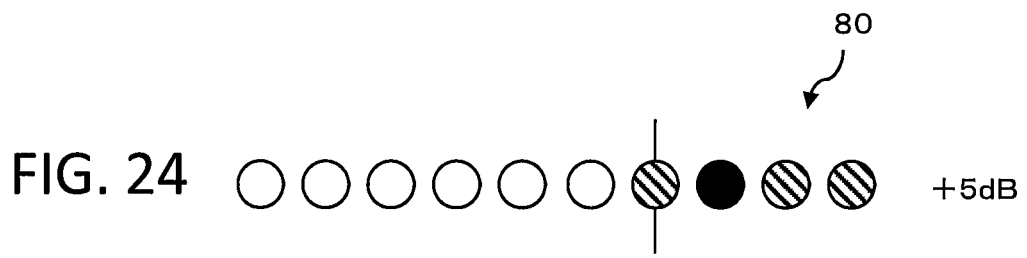
FIG. 24 is an explanatory diagram (part 14) of the change of the display form in the further configuration of the embodiment of the present disclosure.

FIG. 24 shows a case in which the user operate the sound volume to +5 dB. In this case, the LED corresponding to 0 dB which is the prescribed value, and the group of LEDs at the right of this LED are lighted with the second color and are displayed in the highlighted manner, and an LED, in this group of LEDs, at a position corresponding to the operation value is lighted with the first color. The group of LEDs at the left of the LED corresponding to 0 dB are not lighted and are not displayed in the highlighted manner.

FIGS. 25~29 show other examples of the index display region 80 of the sound volume.

Figure 25:
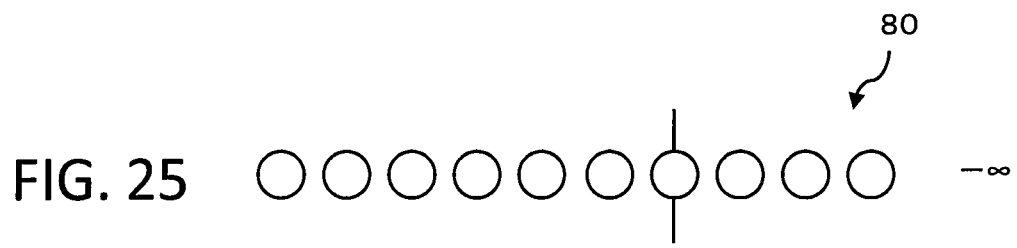
FIG. 25 is an explanatory diagram (part 15) of the change of the display form in the further configuration of the embodiment of the present disclosure.
Figure 26:
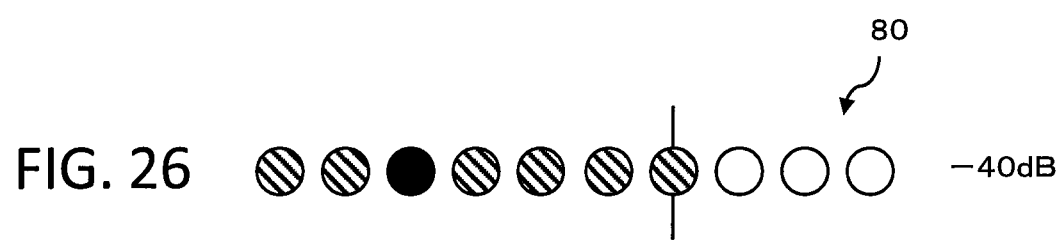
FIG. 26 is an explanatory diagram (part 16) of the change of the display form in the further configuration of the embodiment of the present disclosure.
Figure 27:
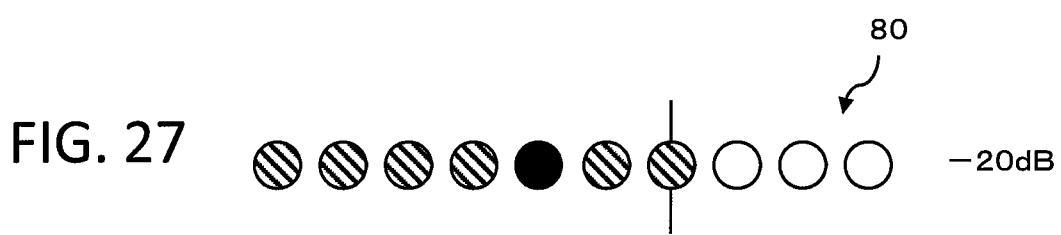
FIG. 27 is an explanatory diagram (part 17) of the change of the display form in the further configuration of the embodiment of the present disclosure.
Figure 28:
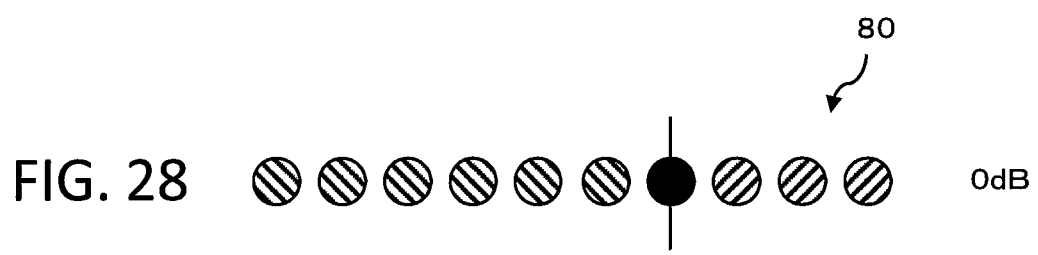
FIG. 28 is an explanatory diagram (part 18) of the change of the display form in the further configuration of the embodiment of the present disclosure.

FIGS. 25~27 are similar to FIGS. 20~22. In FIG. 28, when the user operates the sound volume to 0 dB which is the prescribed value, the group of LEDs at the left of the LED corresponding to 0 dB are continued to be lighted with the second color, and the group of LEDs at the right of the LED corresponding to 0 dB are lighted with a third color and are displayed in the highlighted manner.

Figure 29:
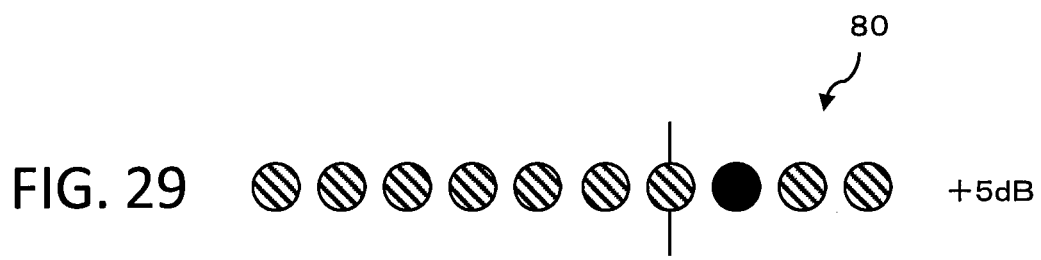
FIG. 29 is an explanatory diagram (part 19) of the change of the display form in the further configuration of the embodiment of the present disclosure.
Figure 30:
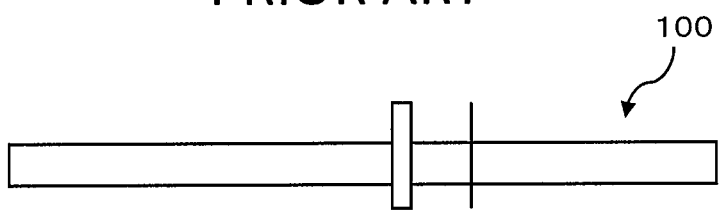
FIG. 30 is an explanatory diagram of a display form of related art (part 1)
Figure 31:
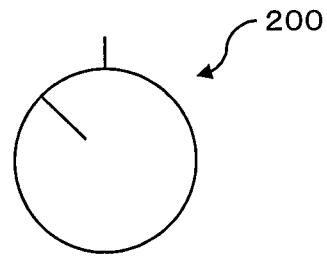
FIG. 31 is an explanatory diagram of a display form of related art (part 2).

FIG. 29 shows a case in which the user operates the sound volume to +5 dB. In this case, all LEDs are lighted with the second color and are displayed in the highlighted manner. Because all LEDs are displayed in the highlighted manner with the same color, the user can easily visually confirm that the parameter setting value exceeds 0 dB.

The invention claimed is:

1. An audio apparatus comprising:
an operator that operates an audio signal;
a display that displays a relationship between a parameter setting value according to an operation of the operator and a prescribed value, wherein the display includes a first display region and a second display region; and
a controller that changes a display form of the display, such that, when the parameter setting value is deviated from the prescribed value, a display form is employed for the display which differs from a display form when the parameter setting value coincides with the prescribed value, regardless of an amount of deviation, wherein:
the controller does not cause the first and second display regions to be displayed in a highlighted manner when the parameter setting value coincides with the prescribed value,
the controller causes the first display region to be uniformly displayed in the highlighted manner when the parameter setting value is deviated from the prescribed value by a plurality of amounts of deviation by operation of the operator in a first direction, and
the controller causes the second display region to be uniformly displayed in the highlighted manner when the parameter setting value is deviated from the prescribed value by a plurality of amounts of deviation by operation of the operator in a second direction.

2. The audio apparatus according to claim 1, wherein the operator is an operator for sound image localization, the display has display regions placed at left and right centered at a center which is the prescribed value, and the controller causes the display region at the left to be uniformly displayed in the highlighted manner, regardless of the amount of deviation, when the parameter setting value is deviated from the prescribed value to the left; and causes the display region at the right to be uniformly displayed in the highlighted manner, regardless of the amount of deviation, when the parameter setting value is deviated from the prescribed value to the right.

3. The audio apparatus according to claim 2, wherein the display region at the left has a triangular shape with a width widening toward left, and
the display region at the right has a triangular shape with a width widening toward right.

4. The audio apparatus according to claim 1, wherein the operator is an operator for sound volume,
the display has a first display region placed with reference to −∞ which is the prescribed value, and a second display region placed with reference to 0 dB which is the prescribed value, and
the controller does not cause the first display region and the second display region to be displayed in a highlighted manner when the parameter setting value coincides with the prescribed value; causes the first display region to be uniformly displayed in the highlighted manner, regardless of the amount of deviation, when the parameter setting value is deviated from the −∞ and is operated to a value between −∞ and 0 dB; and causes the second display region to be uniformly displayed in the highlighted manner, regardless of the amount of deviation, when the parameter setting value is deviated from the 0 dB and is operated beyond 0 dB.

5. The audio apparatus according to claim 1, wherein the operator is an operator for sound volume,
the display has a first display region placed with reference to −∞ which is the prescribed value, and a second display region placed with reference to 0 dB which is the prescribed value, and
the controller does not cause the first display region and the second display region to be displayed in a highlighted manner when the parameter setting value coincides with −∞; causes the first display region to be uniformly displayed in the highlighted manner with a particular color, regardless of the amount of deviation, when the parameter setting value is deviated from the −∞ and is operated to a value between −∞ and 0 dB; causes the second display region to be uniformly displayed in the highlighted manner with a color different from the particular color, when the parameter setting value coincides with the 0 dB; and causes the second display region to be uniformly displayed in the highlighted manner with the particular color, regardless of the amount of deviation, when the parameter setting value is deviated from the 0 dB and is operated beyond 0 dB.

6. The audio apparatus according to claim 2, wherein the controller further causes the parameter setting value to be displayed in an overlapping manner on one of the display regions at a position corresponding to the amount of deviation from the prescribed value.

7. The audio apparatus according to claim 2, wherein the controller further causes the parameter setting value to be displayed in an overlapping manner on one of the display regions at a position corresponding to the amount of deviation from the prescribed value.

8. The audio apparatus according to claim 4, wherein the controller further causes the parameter setting value to be displayed in an overlapping manner on one of the display regions at a position corresponding to the amount of deviation from the prescribed value.

9. The audio apparatus according to claim 5, wherein the controller further causes the parameter setting value to be displayed in an overlapping manner on one of the display regions at a position corresponding to the amount of deviation from the prescribed value.

10. An audio apparatus comprising:
an operator that operates an audio signal;
a display that displays a relationship between a parameter setting value according to an operation of the operator and a prescribed value, wherein the display includes a first display region and a second display region; and
one or more processors, wherein
the one or more processors are configured, by executing a program stored in a memory, to:
change a display form of the display, such that, when the parameter setting value is deviated from the prescribed value, a display form is employed for the display which differs from a display form when the parameter setting value coincides with the prescribed value, regardless of an amount of deviation, wherein the one or more processors are configured to:
not cause the first and second display regions to be displayed in a highlighted manner when the parameter setting value coincides with the prescribed value,
cause the first display region to be uniformly displayed in the highlighted manner when the parameter setting value is deviated from the prescribed value by a plurality of amounts of deviation by operation of the operator in a first direction, and
cause the second display region to be uniformly displayed in the highlighted manner when the parameter setting value is deviated from the prescribed value by a plurality of amounts of deviation by operation of the operator in a second direction.

11. The audio apparatus according to claim 10, wherein the operator is an operator for sound image localization,
the display has display regions placed at left and right centered at a center which is the prescribed value, and
the one or more processors are configured to: cause the display region at the left to be uniformly displayed in the highlighted manner, regardless of the amount of deviation, when the parameter setting value is deviated from the prescribed value to the left; and cause the display region at the right to be uniformly displayed in the highlighted manner, regardless of the amount of deviation, when the parameter setting value is deviated from the prescribed value to the right.

12. The audio apparatus according to claim 11, wherein the display region at the left has a triangular shape with a width widening toward left, and
the display region at the right has a triangular shape with a width widening toward right.

13. The audio apparatus according to claim 10, wherein the operator is an operator for sound volume,
the display has a first display region placed with reference to −∞ which is the prescribed value, and a second display region placed with reference to 0 dB which is the prescribed value, and
the one or more processors are configured to: not cause the first display region and the second display region to be displayed in a highlighted manner when the parameter setting value coincides with the prescribed value; cause the first display region to be uniformly displayed in the highlighted manner, regardless of the amount of deviation, when the parameter setting value is deviated from the −∞ and is operated to a value between −∞ and 0 dB; and cause the second display region to be uniformly displayed in the highlighted manner, regardless of the amount of deviation, when the parameter setting value is deviated from the 0 dB and is operated beyond 0 dB.

14. The audio apparatus according to claim 10, wherein the operator is an operator for sound volume,
the display has a first display region placed with reference to −∞ which is the prescribed value, and a second display region placed with reference to 0 dB which is the prescribed value, and
the one or more processors are configured to: not cause the first display region and the second display region to be displayed in a highlighted manner when the parameter setting value coincides with −∞; cause the first display region to be uniformly displayed in the highlighted manner with a particular color, regardless of the amount of deviation, when the parameter setting value is deviated from the −∞ and is operated to a value between −∞ and 0 dB; cause the second display region to be uniformly displayed in the highlighted manner with a color different from the particular color, when the parameter setting value coincides with the 0 dB; and cause the second display region to be uniformly displayed in the highlighted manner with the particular color, regardless of the amount of deviation, when the parameter setting value is deviated from the 0 dB and is operated beyond 0 dB.

15. The audio apparatus according to claim 10, wherein the one or more processors are further configured to cause the parameter setting value to be displayed in an overlapping manner on one of the display regions at a position corresponding to the amount of deviation from the prescribed value.

16. The audio apparatus according to claim 11, wherein the one or more processors are further configured to cause the parameter setting value to be displayed in an overlapping manner on one of the display regions at a position corresponding to the amount of deviation from the prescribed value.

17. The audio apparatus according to claim 13, wherein the one or more processors are further configured to cause the parameter setting value to be displayed in an overlapping manner on one of the display regions at a position corresponding to the amount of deviation from the prescribed value.

18. The audio apparatus according to claim 14, wherein the one or more processors are further configured to cause the parameter setting value to be displayed in an overlapping manner on one of the display regions at a position corresponding to the amount of deviation from the prescribed value.

* * * * *